US010205918B2

(12) United States Patent
Niedermeyer et al.

(10) Patent No.: US 10,205,918 B2
(45) Date of Patent: Feb. 12, 2019

(54) LIGHTING STRUCTURE FOR INTEGRATED REAR PROJECTING VIDEO DISPLAY

(71) Applicant: NIEDO GROUP, INC., Beaverton, OR (US)

(72) Inventors: Terrence Patrick Niedermeyer, Beaverton, OR (US); Kyle Martin Cole, Beaverton, OR (US)

(73) Assignee: NIEDO GROUP, INC., Beaverton, OR (US)

(*) Notice: Subject to any disclaimer, the term of this patent is extended or adjusted under 35 U.S.C. 154(b) by 0 days.

(21) Appl. No.: 15/981,291

(22) Filed: May 16, 2018

(65) Prior Publication Data

US 2019/0007662 A1   Jan. 3, 2019

Related U.S. Application Data

(60) Provisional application No. 62/527,217, filed on Jun. 30, 2017.

(51) Int. Cl.
| | |
|---|---|
| *H04N 9/31* | (2006.01) |
| *G03B 21/20* | (2006.01) |
| *F21S 4/28* | (2016.01) |
| *H05B 33/08* | (2006.01) |

(52) U.S. Cl.
CPC ............ *H04N 9/3138* (2013.01); *F21S 4/28* (2016.01); *G03B 21/2033* (2013.01); *H05B 33/0857* (2013.01)

(58) Field of Classification Search
CPC .. G03B 21/14; G03B 21/145; G03B 21/2013; G03B 21/2033; H04N 9/3105; H04N 9/3138; F21S 4/28; F21Y 2115/10; A47F 11/10
See application file for complete search history.

(56) References Cited

U.S. PATENT DOCUMENTS

2010/0085757 A1* 4/2010 Barkdoll ................ A47F 11/10
                                                        362/282
2011/0204009 A1* 8/2011 Karan ...................... A47F 1/12
                                                        211/59.2

* cited by examiner

*Primary Examiner* — Sultan Chowdhury
(74) *Attorney, Agent, or Firm* — Schwabe, Williamson & Wyatt, P.C.

(57) ABSTRACT

Disclosed is a display device having a support frame, a front panel having a front surface and a back surface, coupled to the support frame; and a projection array for a rear projection on the back surface of the front panel. The projection array includes a plurality of horizontal video projection bars, wherein the horizontal light projection bars are vertically spaced apart, and wherein each of the horizontal light projection bars comprises a plurality of light projection sources. The display device further includes a power source and a video image controller for controlling the plurality of light projection sources.

23 Claims, 7 Drawing Sheets

LIGHTING STRUCTURE FOR INTEGRATED REAR PROJECTING VIDEO DISPLAY

CROSS-REFERENCE TO RELATED APPLICATION

This application claims the priority benefit of the earlier filing date of U.S. Provisional Patent Application No. 62/527,217, filed Jun. 30, 2017, which is hereby specifically incorporated herein by reference in its entirety.

TECHNICAL FIELD

Embodiments herein relate to the field of backlit video display graphic displays, for example, in trade show displays, point of purchase displays, retail displays, and graphic advertisements.

BACKGROUND

In recent years, back lighting display graphics with light emitting diodes (LED) has become the industry standard. Due to the high price of trade shows, display space, shipping and labor cost, the need for portability and easy installation is crucial. LED lights along with large format textiles are highly portable and efficient which is important to save on shipping and labor cost. Both LED lights and textile prints require a support frame or structure in which to attach. Currently, LED lights are dimmable and can be set to a wide range of colors, but the ability to individually control each pixel in a portable light setup is not available.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
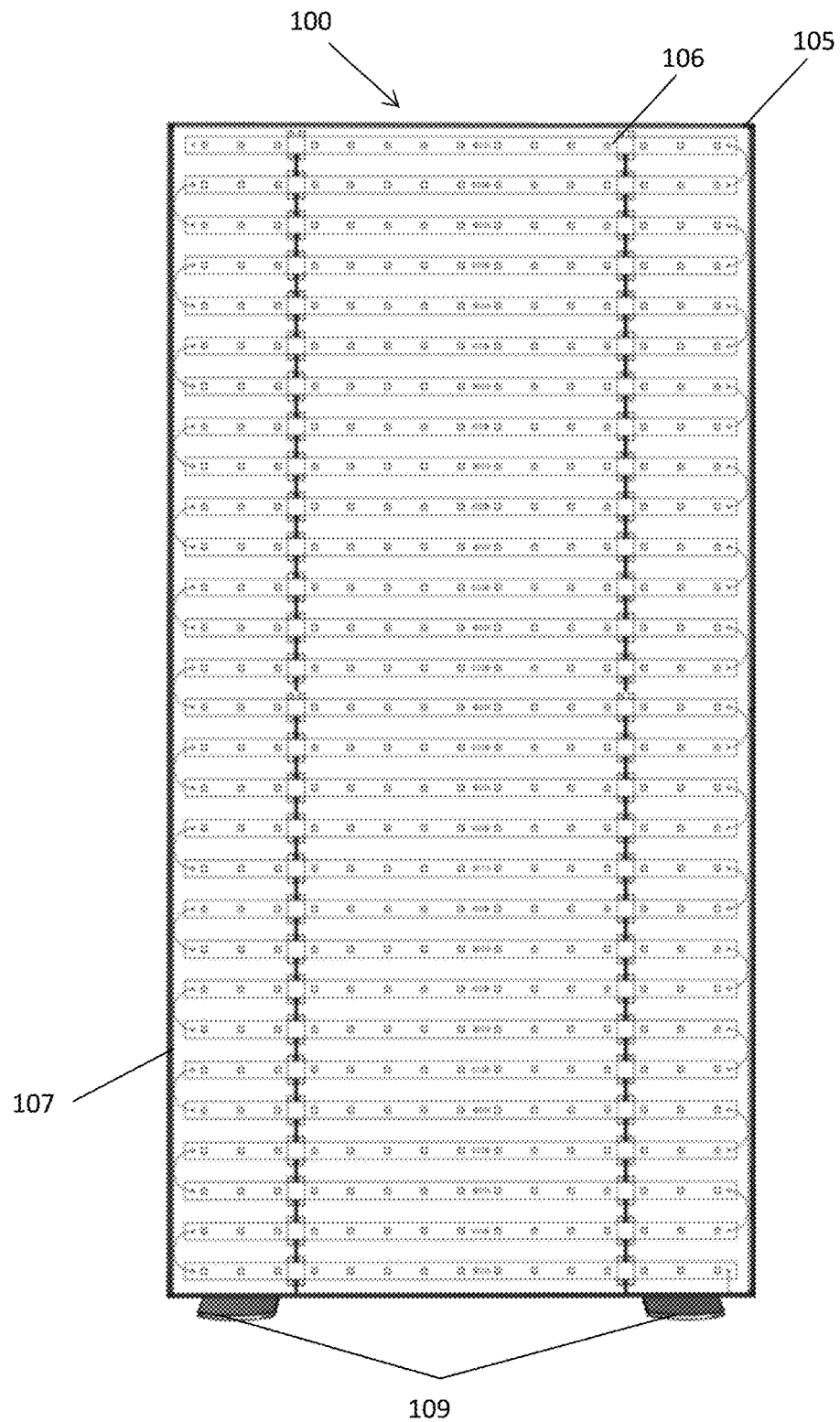
FIG. 1A illustrates a front perspective view of a rear projection view screen, in accordance with various embodiments.

In the following detailed description, reference is made to the accompanying drawings, which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Typically video displays and LED array screen, and in particular large displays, are made from a mosaic of individual flat panels that must be fit together, such as affixed to a complex frame. Such displays are expensive, complex to assemble, fragile, and difficult to ship. The present disclosure overcomes these problems by providing a display device for displaying backlit video and/or animation graphics on to the back of a display screen, such as a textile screen found in a light box display. The disclosed embodiments are particularly suited for capturing the attention of a potential customer, for example, walking through a tradeshow. The disclosed display device uses electronic means to generate interest in the graphic display present on the display surfaces of the display device, for example by using graphics that move or simulate movement. This is accomplished by illuminating the display graphics in a way such that an approaching potential customer sees the moving illuminated display graphic and can be drawn to it. One of the many advantages of the disclosed display device is that it has the ability to be re-used on a continual basis, e.g., it is not viewed as a single use, single product display device. Because both the graphics, both static and motive, have the ability to be changed, the disclosed display device has an environmental advantage compared to other conventional point of sale static and lighted signs. Furthermore, the control system of the device can be configured with a slot(s) for a USB stick and/or memory, which makes the moving graphical aspect of the display easily changeable and/or modifiable.

In embodiments, a display device is provided that includes: a support frame; a front panel having a front surface and a back surface, coupled to the support frame; a projection array for a rear projection on the back surface of the front panel, the projection array including a plurality of horizontal video projection bars, wherein the horizontal light projection bars are vertically spaced apart, and wherein each of the horizontal light projection bars includes a plurality of light projection sources; a power source; and a video image controller for controlling the plurality of light projection sources. In embodiments, the light projection sources are arranged in one or more rows on the horizontal video projection bars, such as one row, two rows spaced apart vertically, or even three or more rows spaced apart vertically. In embodiments, the light projection sources are light-emitting diodes. In certain embodiments, the light projection sources are light-emitting diodes that emit in the red, green, and blue light spectrum. In certain embodiments, the light projection sources are light-emitting diodes that emit in the red, green, blue and white light spectrum. In embodiments, the light-emitting diodes that emit in the red, green, and blue light spectrum include three independent LED devices which are disposed together and respectively emit red light beams, green light beams, blue light beams and optionally white light beams. Other colors are also contemplated.

In embodiments, the display device further includes static graphics on the front panel. In embodiments, the front panel includes a fabric panel. In embodiments, the display device further including a rear panel having a front surface and a back surface coupled to the support frame opposite the front panel. In embodiments, the rear panel includes a fabric panel. In embodiments, the display device further includes static graphics on the rear panel. In embodiments, the display device further includes a second a projection array for a rear projection on the back surface of the rear panel. In embodiments, the plurality of light projection sources are individually adjustable to compensate for inconsistencies in spacing of the plurality of light projection sources. In embodiments, the plurality of light projection sources are coupled in series and disposed on a printed circuit board, which can be removable for example to replace the lights.

In embodiments, the video image controller is a computing device configured to generate video content for the display device, the computing device including: memory; and a processing unit encoding instructions that, when executed by the processing unit, cause the processing unit to control the light projection sources. In some embodiments, the video image controller includes slots for the insertion of a USB stick, a memory card, or other media that is capable of containing the graphics for the video content.

In embodiments, the display device further includes a power source to power the display device. In embodiments, the light projection sources are detachable for replacement. In embodiments, the horizontal light projection bars are configured as a ladder array. In embodiments, the display device is configured as a silicon edge graphic light box (SEG). In embodiments, the display device further includes a motion, sound, or proximity sensor. In embodiments, the display device further includes an RFID sensor. A system for video display is also disclosed, including a plurality of connected display devices.

Figure 1B:
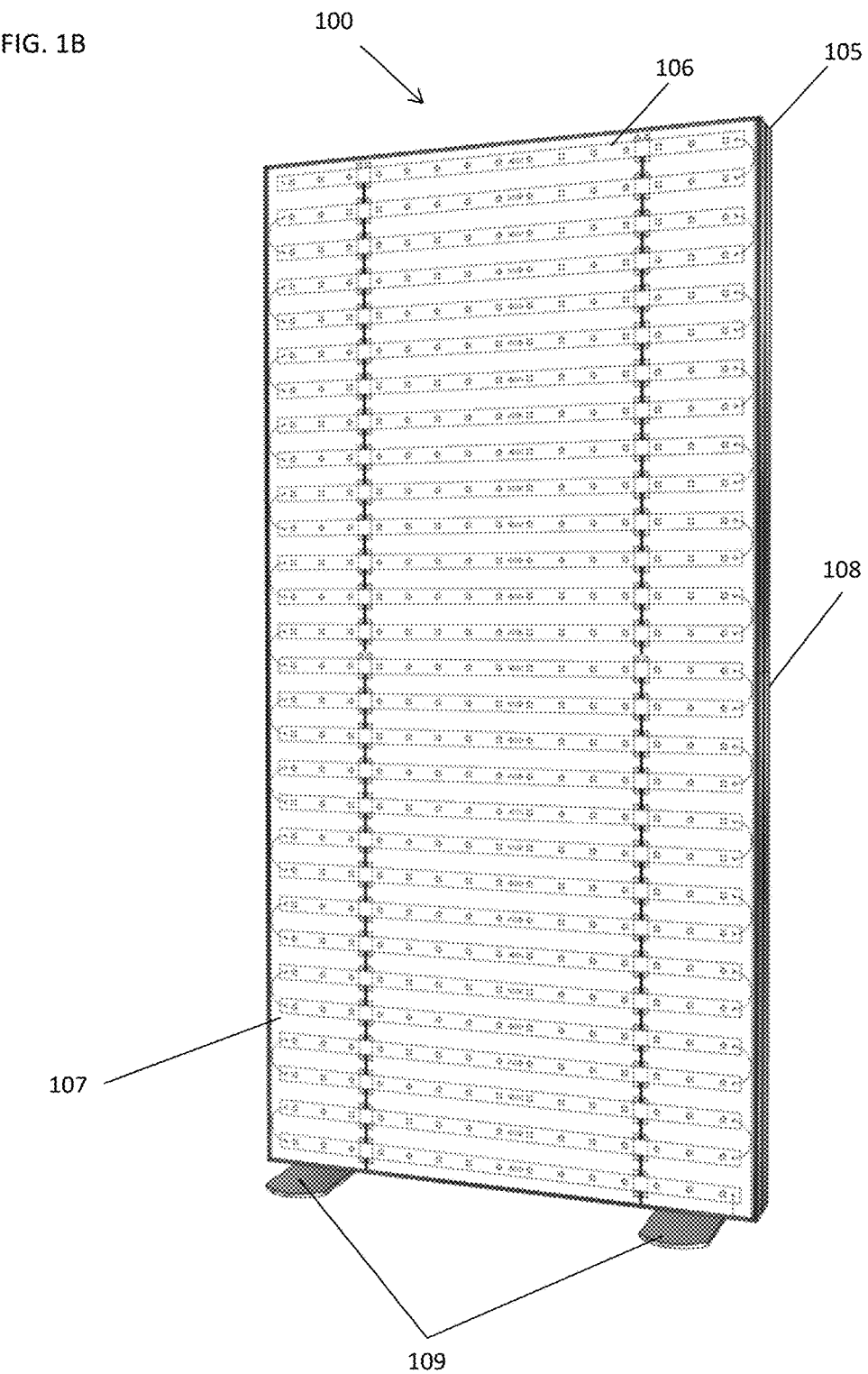
FIG. 1B illustrates a left side perspective view of a rear projection view screen, in accordance with various embodiments.
Figure 1C:
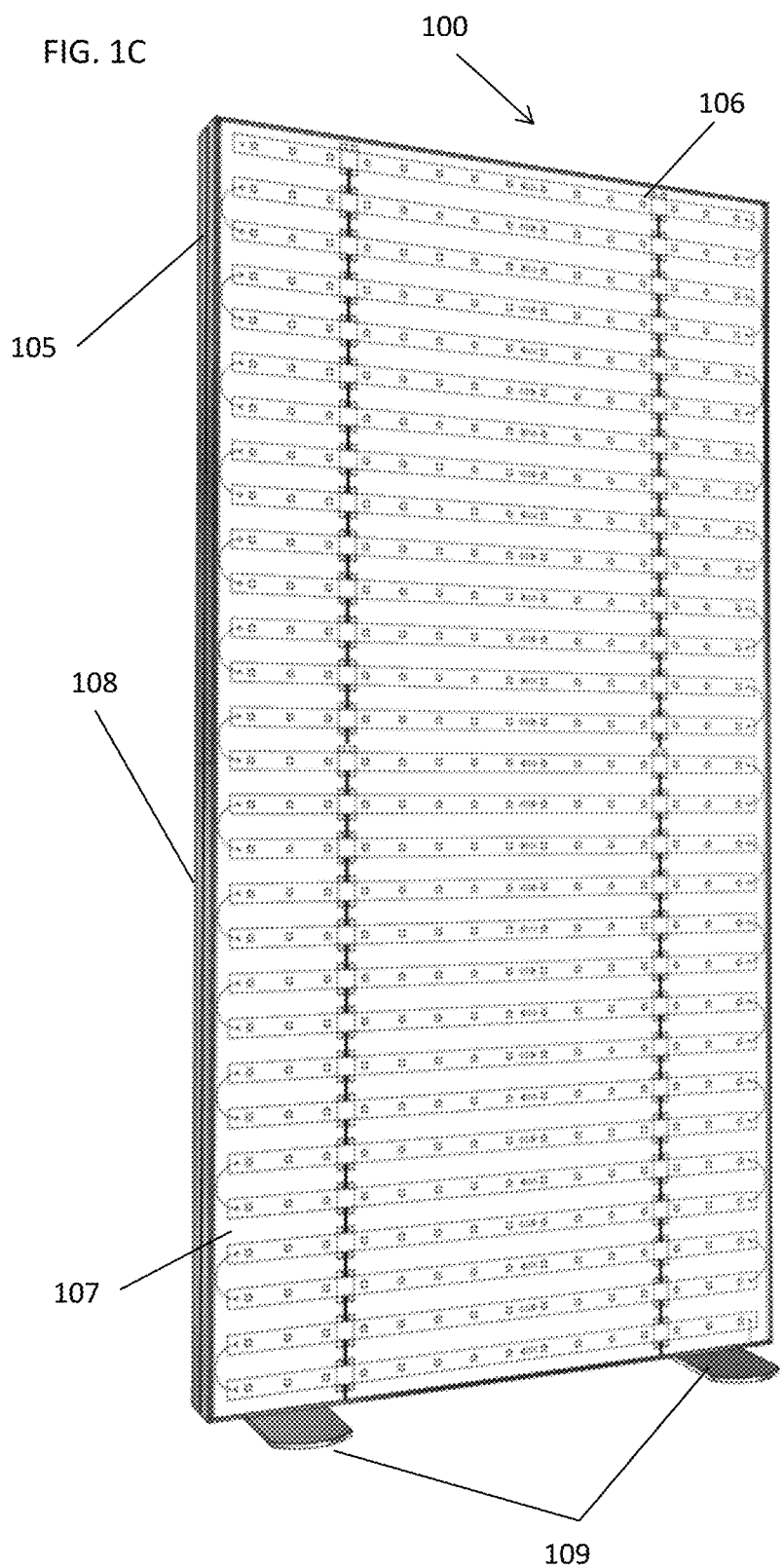
FIG. 1C illustrates a right side perspective view of a rear projection view screen, in accordance with various embodiments.

FIGS. 1A-1C show an exemplary display device 100 according to embodiments. In certain embodiments, the display device 100 is a portable device. In certain embodiments, the display device 100 is a permanent fixture. With reference to FIGS. 1A-1C, the display device 100 includes a support frame 105, a projection array 106, and a front panel 107. While an exterior support frame is shown it is contemplated that the support frame can be internal, collapsible and or foldable, for example for transport. In certain embodiments, the display device 100 includes tubular support frame. The support frame can be made of any material, such as metal or plastic depending on the application. In certain embodiments formed from extruded aluminum. In some embodiments, the display device 100 includes support tubes that extent vertically.

In certain embodiments, the display device 100 includes a rear panel 108. In certain embodiments, together the front panel 107, the back panel 108, and the support frame 105 form a light box, into which the projection array 106 resides. The front panel 107 and to a lesser extent the back panel 108 are the principle places for static graphics to be placed and rear projected video or animation graphics to be displayed. As shown in FIGS. 1A-1C, the front panel 107 is configured to be illuminated by projection from behind, for example, with light emitting diodes (LEDs) and the like, such that the surface of the front panel 107 give off light, glow or appear illuminated for example with graphics, such as graphics depicting a particular product or service. In certain embodiments, the display device 100 is silicone edge graphic (SEG), for example having a tension fabric graphic surrounded by a thin silicone strip that inserts into a narrow groove along the inner edge of the support frame 105. Upon insertion, the fabric graphic is stretched across the face of the light box for a taut, wrinkle free appearance. Typically printed, for example by dye sublimation, fabric silicone edge graphics have strong color saturation and are well suited to minimize reflected light. A fabric graphic is easily removed by pulling on a small exterior loop tab that is unobtrusively placed in one corner of the graphic. In certain embodiments, the display device includes a collapsible pop-up support framework. In some examples the front panel 107 has static graphics printed or otherwise conditioned on the surface and the rear projected graphics augment the static graphics. For example, an advertisement for a product or service, placed on the surface of the front panel 107 are illuminated. It is contemplated that the graphics would be inter changeable, for example as a thin sheet of printed plastic, fabric, and the like placed on the surface of the front panel 107; however, it is also contemplated that the graphics could be directly placed on the surface of the front panel 107, for example printed. It is contemplated that the graphics can be replaced. FIGS. 1A-1C also show feet 109, for example so that the display device 100 can be free standing, such as when placed in a both at a trade show or other application where a free standing device is desired. While reference is made to the top and bottom of the display device, it is contemplated that the display device 100 can be installed upside down and still function. While particular attention has been given to the front panel 107, it is contemplated that the rear panel 108 can be illuminated, although this is not necessary. In embodiments, the display device 100 may have multiple graphics on both the front and back respectively, allowing the illumination of the multiple graphics.

Figure 2A:
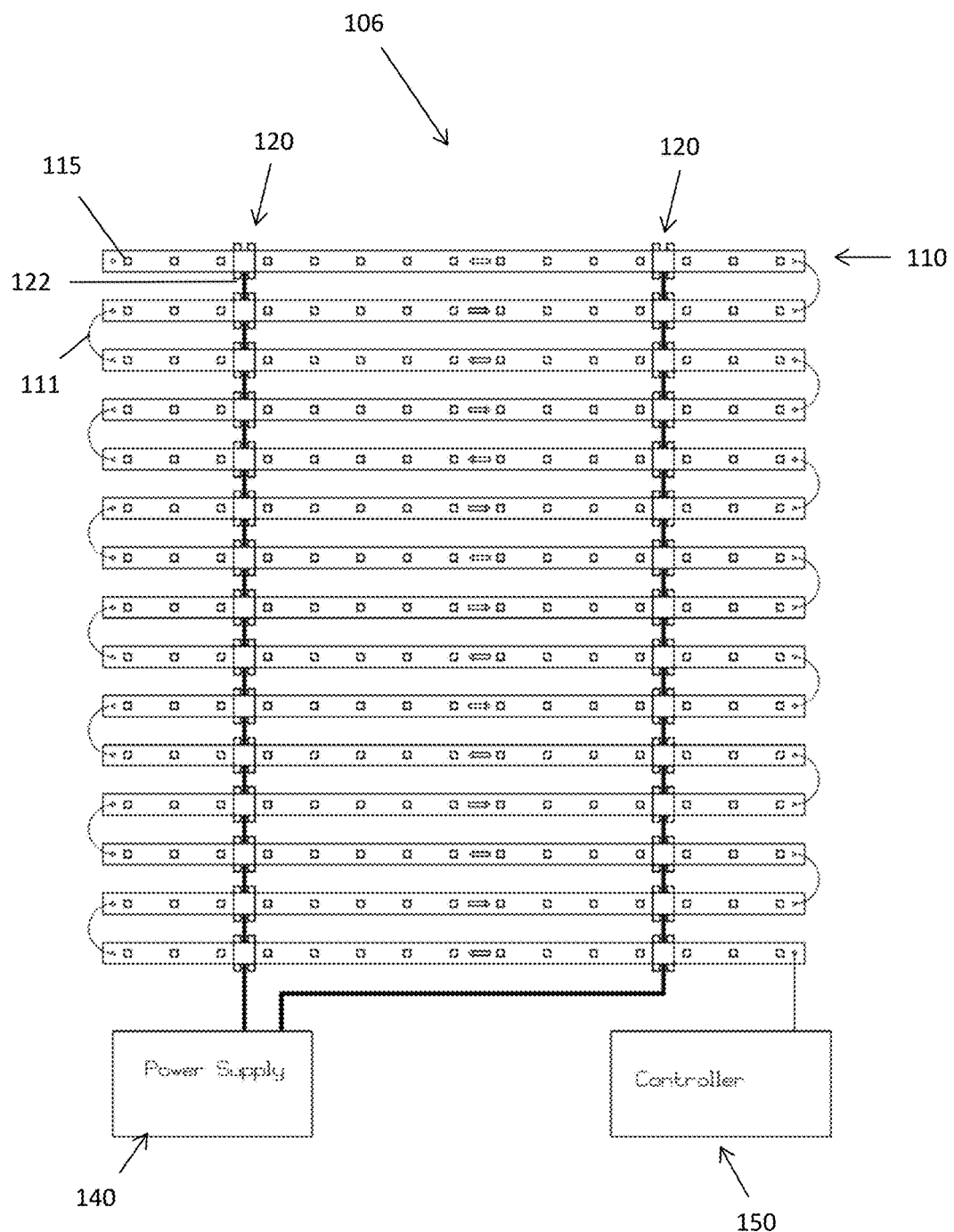
FIG. 2A illustrates a front view of a projection array for a rear projection view screen, in accordance with various embodiments.
Figure 2B:
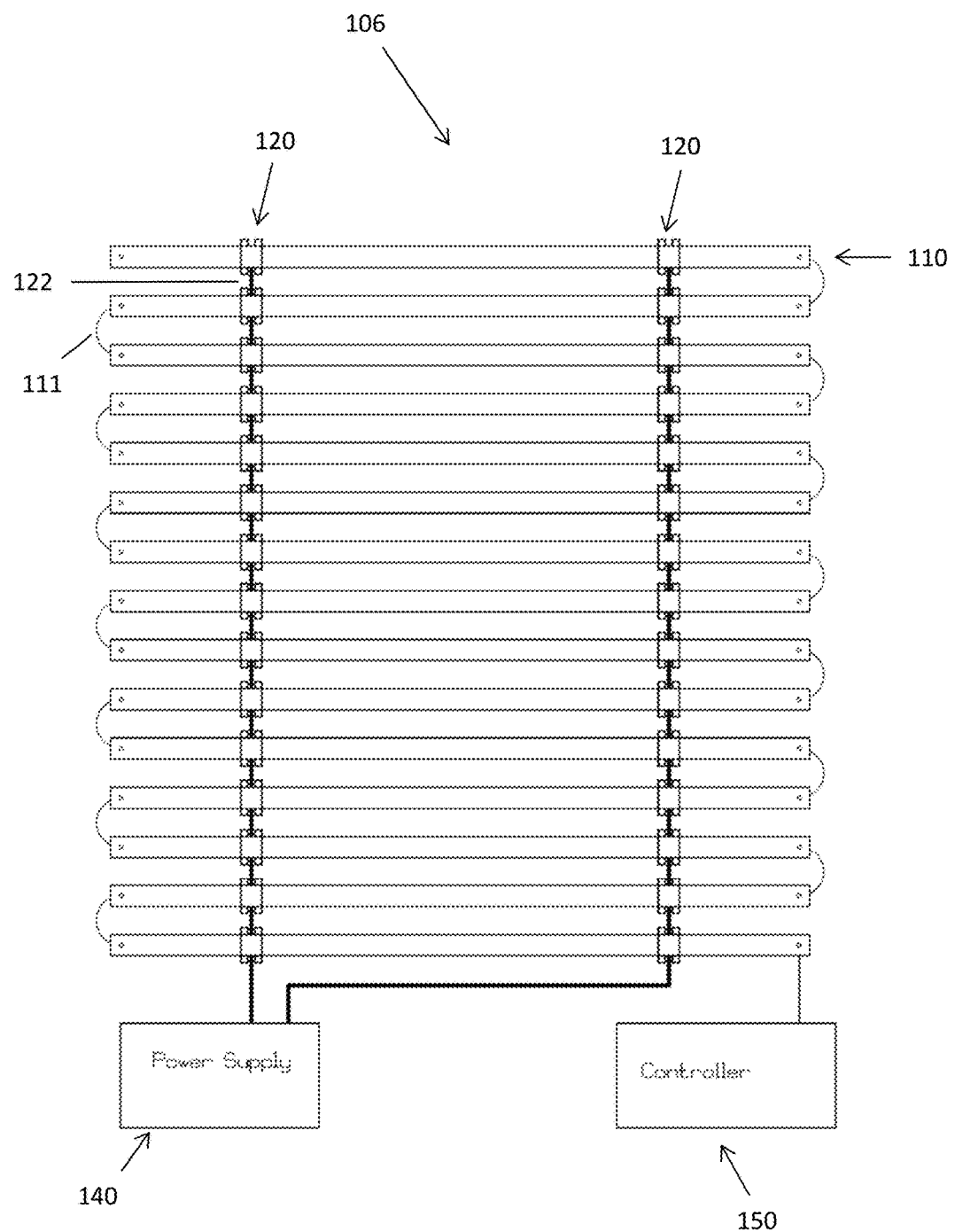
FIG. 2B illustrates a rear view of a projection array for a rear projection view screen, in accordance with various embodiments.

FIGS. 2A and 2B illustrate a projection array 106 for a rear projection view screen, in accordance with various embodiments. FIG. 2A illustrates a front view and FIG. 2B illustrates a rear view of the support frame. The projection array 106 is made up of a plurality of horizontal video projection bars 100 that are connected by power supply cord 122 and couplers 120. The support frame also includes power supply 140 and video image controller 150. As will be described in greater detail below, the horizontal video projection bars 110 each include a plurality of light projection sources 115. The horizontal video projection bars 110 are connected serially by data wires 111, which are in turn connected to the video image controller 150. Each one of the light projection sources can be thought of as a pixel in a pixel array. In embodiments, the individual light projection sources are RGB pixel LED's arranged in rows and/or columns, for example controlled by one or more video image controller 150 box using the one or more data wires 111. The video image controller 150 can be directly connected to a computer, run standalone with an installed program for example on self-contained memory, or use a portable storage device (such as a USB drive, SD card, and the like) to run the program. Multiple arrays may be connected in parallel or series to make larger arrays. Multiple video image controllers 150 can be interconnected to control larger arrays. In some examples, the video image controller 150 and power supply 140 are housed together. In other examples, the video image controller 150 and power supply 140 are not housed together. The plurality of horizontal video projection bars 110 can be hung from the support frame of the display device by the data wires 111 and/or power supply cords 122 or from separate cables interconnecting them, for example coupled to the couplers 120. In some embodiments, the controller includes a waveform, such as a RFID needed to control access. This could be included to inhibit tempering and/or provide for a subscription service to access or change the graphics. In some examples, the plurality of light projection sources are arranged in a standard video arrangement, such as 512 or 1024 pixels.

In certain embodiments, the display device uses rear projected video against static images with a LED ladder light system. In embodiments, the LED lights are RGB pixel style lights with rows or columns of LED strips that feature a power wire and one or more data wires to control them. The data wire(s) gives individual control of each led in the ladder system giving the ability to create animation or movement on the static image. The purpose of creating movement on a static graphic is to attract attention of potential customers. In certain embodiments, the display device is a light box that includes a support framework, includes the following: a support framework that is portable or permanently installed to which RGB pixel LED ladder lights featuring a data wire and one or more static images is mounted on the exterior surfaces of the light box. The lights can be one or more pixel strips that include a rigid circuit board utilizing one or more data wires to control individual pixel lights. A static textile which may contain an image covers only the front or both the front and back of the light box.

Figure 3:
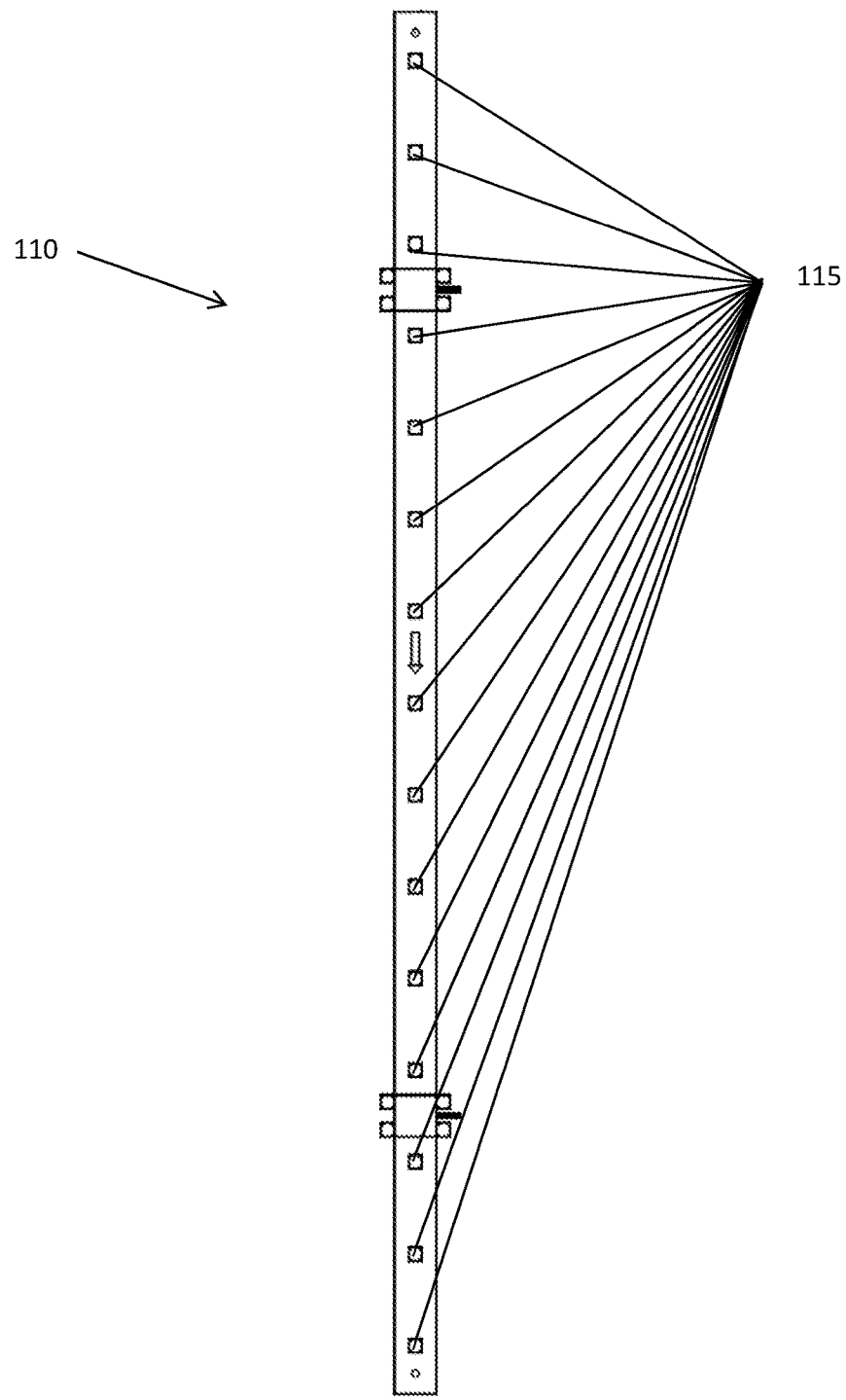
FIG. 3 illustrates a front view of a projection bar for a projection array, in accordance with various embodiments.

FIG. 3 illustrates horizontal video projection bars 110, in accordance with embodiments herein. In embodiments, the light projection sources 115 are disposed, such as printed, on a circuit board. In embodiments, the light projection sources 115 are spaced and arranged parallel to each other in a ladder structure organized in rows and/or columns. In embodiments, the distance between the individual light projection sources is determined, such that an image or graphic is projected from the light projection sources in unison and is not fragmented or disjointed. For example, the controller controls the individual light projection sources in unison so that moving images and/or animation is displayed on the static panel(s). In certain embodiments, the individual light projection sources are adjustable so that the position and/or focal plane of the projected image can be adjusted to make a clearer image.

In some embodiments, the horizontal video projection bars are rollable or foldable to facilitate packing and/or transport. In embodiments, the light projection sources may be detachable from the horizontal video projection bars for replacement. In some embodiments, the plurality of light projection sources are horizontally spaced along the bars with a spacing of between about 10 mm and about 100 mm, such as about 30 mm, or less. In some embodiments, the spacing between light sources is about 30 mm horizontally, for example about 30 mm between the individual lights (each light being 3 pixels RGB).

In certain embodiments, the horizontal video projection bars 110 are connected (top to bottom) by a hinge, for example so that the device can be extended like a fan or window shade. In certain embodiments, the vertical spacing between the plurality of light projection sources is between about 10 mm and about 100 mm, such as about 30 mm, or less. In some embodiments, the spacing between light sources is about 30 mm vertically, for example about 30 mm between the individual lights (each light being 3 pixels RGB). In certain embodiments, the width of the horizontal video projection bars 110 are between about 25 cm inches and about 150 cm, such as about 100 cm.

In some embodiments, the display device 100 includes support tubes that extent vertically to which the horizontal video projection bars 110 can be coupled, such as be a snap on fit. The support tubes can extend from the feet 109 or a base. In certain embodiments, the horizontal video projection bars have a vertical height of between about 20 mm and about 100 mm. In certain embodiments, the horizontal video projection bars are backed with a channel or tube, for example to increase the stiffness of the horizontal video projection bars.

With reference to FIGS. 2A-3, the LEDs 115 are coupled in series and disposed at a printed circuit board and are controlled by an video image controller 150. In certain embodiments, each of the LEDs 115 includes light-emitting diodes that respectively emit red light beams, green light beams and blue light beams. In addition, these diodes are disposed together by package process. Each of the LEDs 115 are used to respectively adjust wavelength and brightness of light beams from these light-emitting diodes and mixes red lights, green light beams, green light beams and blue light beams to generate desirable RGB colors. As shown in FIGS. 2A and 2B, the LEDs 115 electrically connected with the video image controller 150 through the data wires 111, which is used to regulate light beam outputs of each of the LEDs 115 and project an image on the back lit panel.

Figure 4:
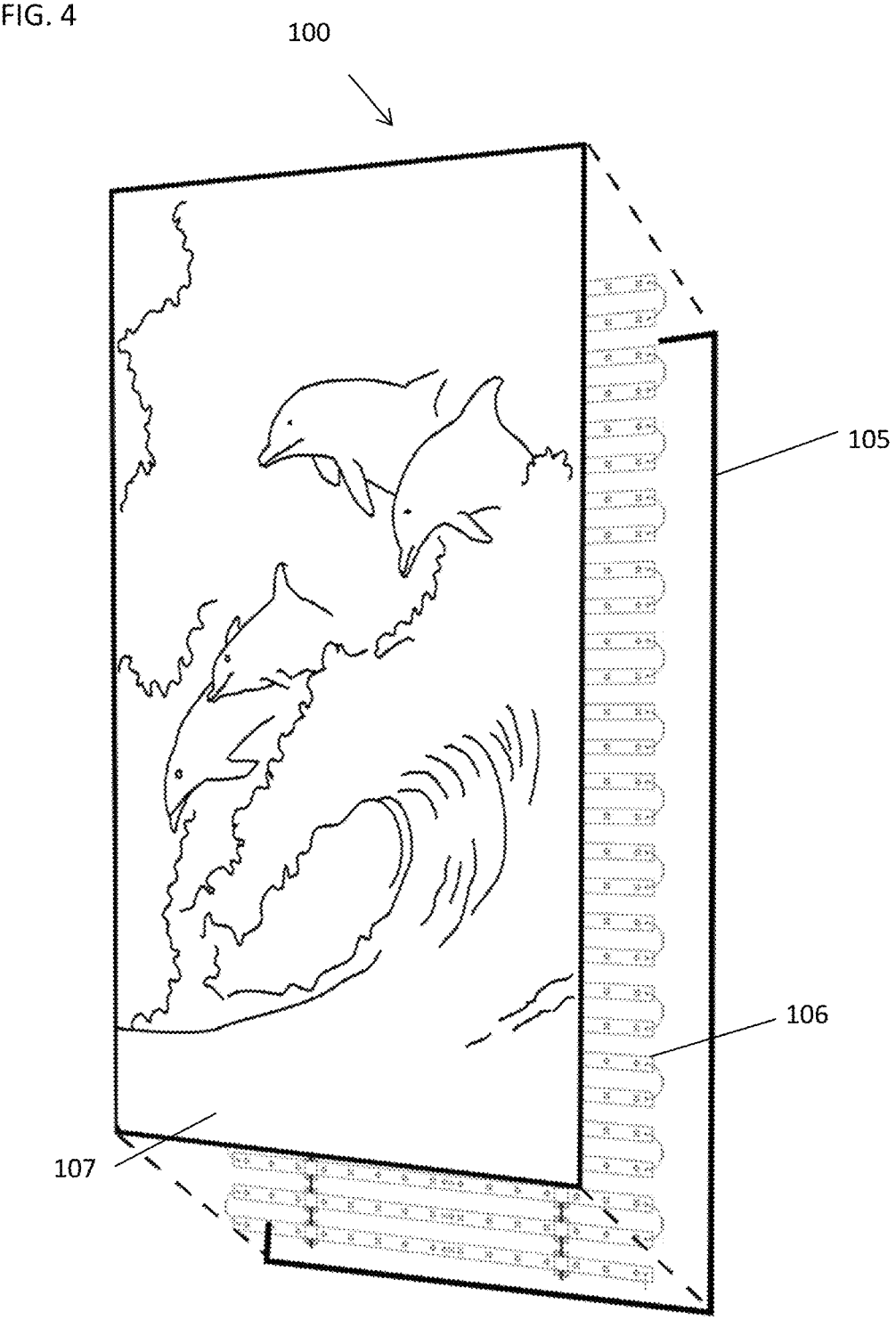
FIG. 4 illustrates an exploded front perspective view of a rear projection view screen, in accordance with various embodiments.

FIG. 4 shows an exploded view of an exemplary display device 100 according to embodiments. The display device 100 includes a support frame 105, a projection array 106, and front panel 107, which can include graphics. As shown the graphic are printed or otherwise coupled to the front panel; however, it is envisioned that the front panel can have a separate graphics portion coupled, such as reversibly coupled, thereto, for example via Velcro, magnets or other coupling means. While an exterior support frame is shown, it is contemplated that the support frame can be internal, collapsible, and or foldable, for example for transport. In certain embodiments, the display device 100 includes a rear panel. The front panel 107 and to a lesser extent the back panel are the primary places for static graphics to be placed and rear projected video or animation graphics to be displayed. In certain embodiments, together the front panel 107 and the support frame 105 form a light box. In certain embodiments, the display device includes a collapsible pop-up support framework. In some examples, the front panel 107 has static graphics printed or otherwise conditioned on the surface and the rear-projected graphics augment the static graphics. It is contemplated that the graphics would be interchangeable, for example as a thin sheet of printed plastic, fabric, and the like placed on the surface of the front panel 107; however, it is also contemplated that the graphics could be directly placed on the surface of the front panel 107, for example printed. It is contemplated that the graphics can be replaced.

While reference is made to the top and bottom of the display device, it is contemplated that the display device 100 can be installed upside down and still function. While particular attention has been given to the front panel 107, it is contemplated that the rear panel can be illuminated, although this is not necessary. In embodiments, the display device 100 may have multiple graphics on both the front and back respectively, allowing the illumination of the multiple graphics. In embodiments, the front panel 107 and/or the projection array 106 may be couplable, such as reversibly couplable to the support frame 105, for example magnetically, with Velcro, or other coupling means.

In some embodiments, the array is coupled to a power source, such as a DC or AC power source, for example, batteries. In some embodiments, multiple power supplies are used. In some examples, a power supply comprises a class 2 transformer, such as a class 2 transformer that meets the requirements or specifications of the CTL/UL standards. In some embodiments, there is also a DC or AC input charging port, for example, for running the display device on DC input, rather than batteries, which if available would be a cost savings. In some examples, when the DC or AC input charging port is plugged in internal power supply from the batteries is superseded. In other embodiment, rechargeable batteries are used (for example, Nickel-Cadmium (Ni-Cad), Lithium Ion (Li-ion) and Nickel-Metal-Hydride (Ni-MH)) and plugging in a charger or AC adapter recharges the batteries. In some embodiments, the advertising device includes an external power supply, such as a battery pack or external DC or AC power supply. In some embodiments, the advertising device includes an internal power supply, such as batteries, for example a rechargeable battery, and optionally a port for recharging the batteries. In some embodiments, the circuit is configured to operate as an "on and forced off" circuit. This means that the display device is active for a period of time and then inactive for a period of time before becoming active again in a cyclic fashion. The forced rest is designed for two things; one is to maintain battery power which will reduce the amount of battery power required, the second is to reduce the possibility of someone triggering the display device for amusement, for example a child who waves their hands in front of it, won't automatically trigger on and off, on and off, on and off, and will eventually tire of the game and move one. In some embodiments, the circuit is configured for an on period of about 1 minute to about 120 minutes or longer, such as about 1, 2, 3, 4, 5, 6, 7, 8, 9, 10, 12, 15, 20, 25, 30, 35, 40, 45, 50, 55, 60, 70, 80, 90, or 120 minutes, for example between about 1 and 10, 5 and 20, or 5 and 8 minutes. In some embodiments, the rest period is configured to be from about 1 minute to about 2 minutes or longer, such as about 1, 2, 3, 4, 5, 6, 7, 8, 9, 10, 12, 15, 20, 25, 30, 35, 40, 45, 50, 55, 60, 70, 80, 90, or 120 minutes, for example between about 10 and 10, 15 and 25, or 5 and 10 and 40 minutes. In a particular example, the circuit is configured to have about 7 minutes of on and 20 minutes of off time (also called 7/20), as this was determined to be optimal for battery life and to also improve the attraction mode, or the attractor mode.

In certain embodiments, the graphics are interactive. For example, display device 100 can include a motion, sound, or other proximity sensor which would be tripped by customers approaching the display. In other embodiments, the interactive component could be RFID triggered. For example, if at a sports museum each guest may be given an RFID tag representing their affiliation and the interactive component could play a video or animation based on their affiliation.

In embodiments, the display device includes a motion sensor that detects the movement of an approaching potential customer or viewer and causes the display to light up when the potential customer draws near, thus drawing the attention of the customer at the appropriate time, while being programmed to conserve power usage, for example prolonging battery life. In certain embodiments, display device 100 includes a motion sensor. Typically the motion sensor is an infrared sensor, such as a passive infrared sensor, although other motion sensors are contemplated for use in the device. In specific embodiments, the motion sensor is an infrared sensor, such as a multifaceted infrared sensor. Passive infrared sensor sensors allow sensing of motion, by detecting changes in levels of infrared radiation. In some examples, the sensor in a motion detector splits in one or more facets that can be used to detect a change in motion. In certain embodiments, the multifaceted lens detects the presence of an approaching customer, such as by detecting the body heat of such customer, and as the customer's heat moves across, two, three or even four facets of the lens, it triggers the device.

In certain embodiments, the display device 100 can be part of a larger display for example as a panel of multiple display devices 100. In some examples, an array of display devices 100 can be controlled by multiple interconnected controllers. In some examples, an array of display devices 100 is controlled by a single controller.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:
1. A display device, comprising:
   a support frame;
   a front panel having a front surface and a back surface, coupled to the support frame;
   a projection array for a rear projection on the back surface of the front panel, the projection array comprising a plurality of horizontal video projection bars, wherein the horizontal light projection bars are vertically spaced apart, and wherein each of the horizontal light projection bars comprises a plurality of light projection sources;

a power source; and a video image controller for controlling the plurality of light projection sources.

2. The display device of claim 1, wherein the light projection sources are light-emitting diodes (LEDs).

3. The display device of claim 2, wherein the LEDs comprise three independent LED devices which are disposed together and respectively emit red light beams, green light beams and blue light beams.

4. The display device of claim 1, further comprising static graphics on the front panel.

5. The display device of claim 1, wherein the front panel comprises a fabric panel.

6. The display device of claim 1, further comprising a rear panel having a front surface and a back surface coupled to the support frame opposite the front panel.

7. The display device of claim 6, wherein the rear panel comprises a fabric panel.

8. The display device of claim 6, further comprising static graphics on the rear panel.

9. The display device of claim 6, further comprising a second projection array for a rear projection on the back surface of the rear panel.

10. The display device of claim 1, wherein the plurality of light projection sources are individually adjustable to compensate for inconsistencies in spacing of the plurality of light projection sources.

11. The display device of claim 1, wherein the plurality of light projection sources are coupled in series and disposed on printed circuit boards.

12. The display device of claim 1, wherein the frame is collapsible and/or foldable.

13. The display device of claim 1, wherein the video image controller is a computing device configured to generate video content for the display device, the computing device including:

memory; and a processing unit encoding instructions that, when executed by the processing unit, cause the processing unit to control the light projection sources.

14. The display device of claim 1, further comprising a power source to power the display device.

15. The display device of claim 1, the light projection sources are detachable for replacement.

16. The display device of claim 1, wherein the horizontal light projection bars are configured as a ladder array.

17. The display device of claim 1, wherein the display device is configured as a silicon edge graphic light box (SEG).

18. The display device of claim 1, further comprising a motion, sound, or proximity sensor.

19. The display device of claim 1, further comprising an RFID sensor.

20. A system for video display, comprising a plurality of connected display devices of claim 1.

21. The display device of claim 1, further comprising a USB stick and/or a memory card for the graphics.

22. The display device of claim 2, wherein the LEDs emit red light beams, green light beams, blue light beams, and optionally white light beams.

23. The display device of claim 1, wherein the plurality of horizontal video projection bars comprise one or more vertically spaced rows of light sources on each bar.

* * * * *